United States Patent [19]

Hatayama et al.

[11] Patent Number: 5,344,262
[45] Date of Patent: Sep. 6, 1994

[54] SLOTTING APPARATUS FOR PRODUCING A SLOT IN INNER CIRCUMFERENTIAL SURFACE OF TUBULAR WORKPIECE

[75] Inventors: Tadatomo Hatayama; Tatsuya Takeuchi, both of Sayama, Japan

[73] Assignee: Honda Giken Kogyo Kabushiki Kaisha, Tokyo, Japan

[21] Appl. No.: 843,198

[22] Filed: Feb. 28, 1992

[30] Foreign Application Priority Data

Mar. 1, 1991 [JP] Japan ................. 3-035990
Jan. 8, 1992 [JP] Japan ................. 4-001476

[51] Int. Cl.$^5$ .............................. B23D 5/00
[52] U.S. Cl. ..................... 409/307; 409/331; 409/334; 83/875; 83/178; 83/185
[58] Field of Search ............. 83/875, 54, 178, 185, 83/604; 409/307, 304, 313, 330, 331, 334

[56] References Cited

U.S. PATENT DOCUMENTS

| | | | |
|---|---|---|---|
| 2,109,356 | 2/1938 | Larsen | 409/334 |
| 2,431,230 | 11/1947 | Cooper | 409/331 |
| 2,905,063 | 9/1959 | Gronau | 409/313 |
| 3,426,646 | 2/1969 | Lee et al. | 409/330 |
| 3,591,139 | 7/1971 | Bishop . | |
| 3,765,305 | 10/1973 | Bishop . | |
| 5,018,913 | 5/1991 | Seiberlich | 409/334 |

FOREIGN PATENT DOCUMENTS 49-49541 12/1974 Japan .
59-115112 7/1984 Japan .
62-34714 2/1987 Japan .
63-47565 9/1988 Japan .

*Primary Examiner*—Eugenia Jones
*Assistant Examiner*—Allan M. Schrock

[57] ABSTRACT

A slotting apparatus has a slotting tool for producing a slot of a substantially arcuate cross section axially in an inner circumferential surface of a tubular workpiece held in position. When the slotting tool moves in one direction axially in the tubular workpiece, it follows an arcuate path by moving progressively toward and away from the inner circumferential surface of the tubular workpiece. The slotting tool cuts off the inner circumferential surface of the tubular workpiece, forming an arcuate slot therein. When the slotting tool moves back, it is spaced from the slotted surface region of the workpiece, and travels along a straight path back to its starting position. The slotting tool is supported on a tool support angularly movably supported by first and second link arms in a casing. The first link arm has a distal end pivotally supported by a fixed shaft in the casing, and the second link arm has a distal end pivotally supported by a first drive crankshaft for revolving movement about the axis thereof. The first drive crankshaft is operatively coupled to a second drive crankshaft that engages the tool support for angularly moving the tool support.

31 Claims, 11 Drawing Sheets 5,344,262

SLOTTING APPARATUS FOR PRODUCING A SLOT IN INNER CIRCUMFERENTIAL SURFACE OF TUBULAR WORKPIECE

BACKGROUND OF THE INVENTION

1. Field of the Invention

The present invention relates to a slotting apparatus for producing a slot in the inner circumferential surfaces of a tubular workpiece such as a sleeve for a rotary valve for use in a power steering system for an automobile.

2. Description of the Background Art

FIG. 12 of the accompanying drawings shows a sleeve W for use in a rotary valve, which has a plurality of angularly spaced port slots a defined in the inner circumferential surface thereof, each having a substantially arcuate cross section in the longitudinal axial direction of the sleeve W. Such port slots a can be produced by a slotting apparatus as disclosed in Japanese patent publication No. 49-49541, for example.

The disclosed slotting apparatus has a slotting tool having a cutter on its distal end. To produce port slots a, the sleeve W is swingably supported on the slotting tool, and then the slotting tool is inserted into the sleeve W. While the sleeve W and the slotting tool are being angularly moved, the cutter progressively cuts the inner circumferential surface of the sleeve W at a desired location on an intermediate region of the inner circumferential surface, thus forming a port slot a.

With the conventional slotting apparatus, however, since the sleeve W and the slotting tool have to be angularly moved in appropriately timed relationship to each other, mechanisms for angularly moving the sleeve W and the slotting tool are relatively complex, large, and expensive. It is also difficult to angularly move the sleeve W and the slotting tool at high speed while keeping them in appropriately timed relationship to each other. Therefore, the prior slotting apparatus has suffered difficulty in slotting the workpiece efficiently within a short period of time.

Another slotting apparatus is disclosed in Japanese laid-open patent publication No. 62-34714, for example.

The slotting apparatus disclosed in the latter publication includes a crank arm having a pair of upper and lower cutters on its distal end, and a crankshaft from which the crank arm extends, the crank arm being swingably supported at its intermediate portion. For producing port slots a in the sleeve W, the cutters are inserted into the sleeve W that is held in position, and then the crankshaft is angularly moved to reciprocally move the cutters together with the crank arm substantially in the axial direction of the sleeve W while at the same time angularly moving the cutters in the vertical direction. The cutters are thus caused to follow substantially elliptical paths in phase with each other. At this time, the cutters cut the inner circumferential surface of the sleeve W in first half strokes of the substantially elliptical paths, thereby simultaneously producing a pair of upper and lower port slots a in the inner circumferential surface of the sleeve W.

The above slotting apparatus is capable of simultaneously producing a pair of port slots a in the sleeve W. However, inasmuch as it is generally difficult to attach both cutters to the crank arm in highly accurate positional relationship, the cutters tend to describe slightly different paths during the slotting process, and hence the port slots a cannot easily be produced to identical shape with high precision.

In addition, because the cutters follow substantially elliptical paths, when the cutters return to their original positions in next half strokes of the paths after they have cut the inner circumferential surface of the sleeve W in the first half strokes, the cutters and the distal end of the crank arm on which they are mounted are displaced from the slotted region relatively largely toward the axis of the sleeve W. Such a cutter displacement poses a problem on attempts to increase the rigidity of the crank arm by increasing the diameter of the distal end of the crank arm for greater resistance to high loads applied to the cutters when they slot the sleeve W. Specifically, the diameter of the distal end of the crank arm cannot be increased to a large extent because the crank arm and the sleeve W must be kept out of physical interference with each other. As a consequence, it has been difficult to give the crank arm a sufficient degree of rigidity to withstand high loads imposed on the cutters during the slotting process.

Japanese patent publication No. 63-47565 also discloses still another slotting apparatus. The disclosed slotting apparatus includes a crank arm having a cutter on its distal end and extending from a crankshaft, the crank arm being swingably supported on its intermediate portion. The cutter is caused to follow a predetermined path to produce a port slot a in the sleeve W by a cam on the crankshaft and a cam follower held against the cam when the crankshaft is angularly moved. At the same time, the cutter is also caused to move toward and away from the inner circumferential surface of the sleeve W by a second cam that is held against the cam follower through a rod, for slotting the inner circumferential surface of the sleeve W.

The above slotting apparatus is however disadvantageous in that the two cams, which are relatively large in size, are juxtaposed on one plane, and need respective complex drive mechanisms, thus making the slotting apparatus large and complex.

SUMMARY OF THE INVENTION

In view of the aforesaid drawbacks of the conventional slotting apparatus, it is an object of the present invention to provide a relatively simple and small slotting apparatus which can efficiently produce, at high speed, a slot of substantially arcuate cross section in the inner circumferential surface of a tubular workpiece such as a sleeve for a rotary valve, and which can withstand high loads imposed while it is slotting the workpiece.

According to the present invention, the above object can be achieved by a slotting apparatus for producing a slot of a substantially arcuate cross section axially in an inner circumferential surface of a tubular workpiece held in position, comprising a tool support supporting on a distal end thereof a slotting tool to be inserted into the tubular workpiece for slotting the same, a casing, the tool support and the slotting tool being supported in the casing for movement in axial and transverse directions of the tubular workpiece, first and second link arms housed in the casing and spaced from each other substantially in the axial direction of the tubular workpiece, the first and second link arms being angularly movably mounted at respective ends thereof on the tool support and extending from the tool support, a support shaft, the first link arm having a distal end angularly movably supported on the casing through the support shaft, a first drive crankshaft rotatably supported on the casing, the second link arm having a distal end angularly movably supported on the first drive crankshaft, and a second drive crankshaft rotatably supported on the casing for rotation in synchronism with the first drive crankshaft, the tool support being angularly movably supported by the first and second link arms for angular movement about the support shaft and the first drive crankshaft, respectively, to cause the slotting tool to move along the inner circumferential surface of the tubular workpiece, the second drive crankshaft engaging the tool support for causing, upon rotation thereof, the tool support to move reciprocally substantially in the axial direction of the tubular workpiece, the first drive crankshaft being operatively coupled to the second drive crankshaft for synchronized rotation to cause the distal end of the second link arm to revolve around the axis of the second drive crankshaft, the arrangement being such that when the tool support is angularly moved in one direction axially with respect to the tubular workpiece upon rotation of the second drive crankshaft and revolution of the distal end of the second link arm, the slotting tool follows a path to cut off substantially arcuately the inner circumferential surface of the tubular workpiece, and when the tool support is angularly moved in an opposite direction axially with respect to the tubular workpiece, the slotting tool follows a path transversely spaced from the inner circumferential surface of the tubular workpiece and substantially parallel to the axis of the tubular workpiece.

When the second drive crankshaft is rotated with the slotting tool inserted in the tubular workpiece, the tool support reciprocally moves, together with the slotting tool and the first and second link arms, along the inner circumferential surface of the tubular workpiece.

If the distal ends of both the first and second link arms were pivotally supported at fixed positions on the casing, then the slotting tool would follow the same substantially arcuate path in both opposite directions.

According to the present invention, since the distal end of the second link arm is pivotally supported on the first drive crankshaft that rotates in synchronism with the second drive crankshaft, the distal end of the second link arm revolves around the axis of the first drive crankshaft when the tool support reciprocally moves. With the radius of the revolving movement being suitably selected and the first and second drive crankshafts being initially phased appropriately to each other, since the distal end of the second link arm revolves around the axis of the first drive crankshaft, when the tool support moves in one of the opposite directions the slotting tool follows a substantially arcuate path in the inner circumferential surface of the tubular workpiece, and when the tool support moves in the other of the opposite directions, the slotting tool follows a straight path in the workpiece off the inner circumferential surface thereof substantially parallel to the axis of the tubular workpiece.

When the slotting tool follows the arcuate path, it cuts off the inner circumferential surface of the tubular workpiece, forming a slot of an arcuate cross section therein. When the slotting tool follows the straight path, it linearly moves off the slotted inner circumferential surface in the axial direction of the tubular workpiece back to a starting position.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

A slotting apparatus according to an embodiment of the present invention will be described below with reference to FIGS. 1 through 7.

Figure 1:
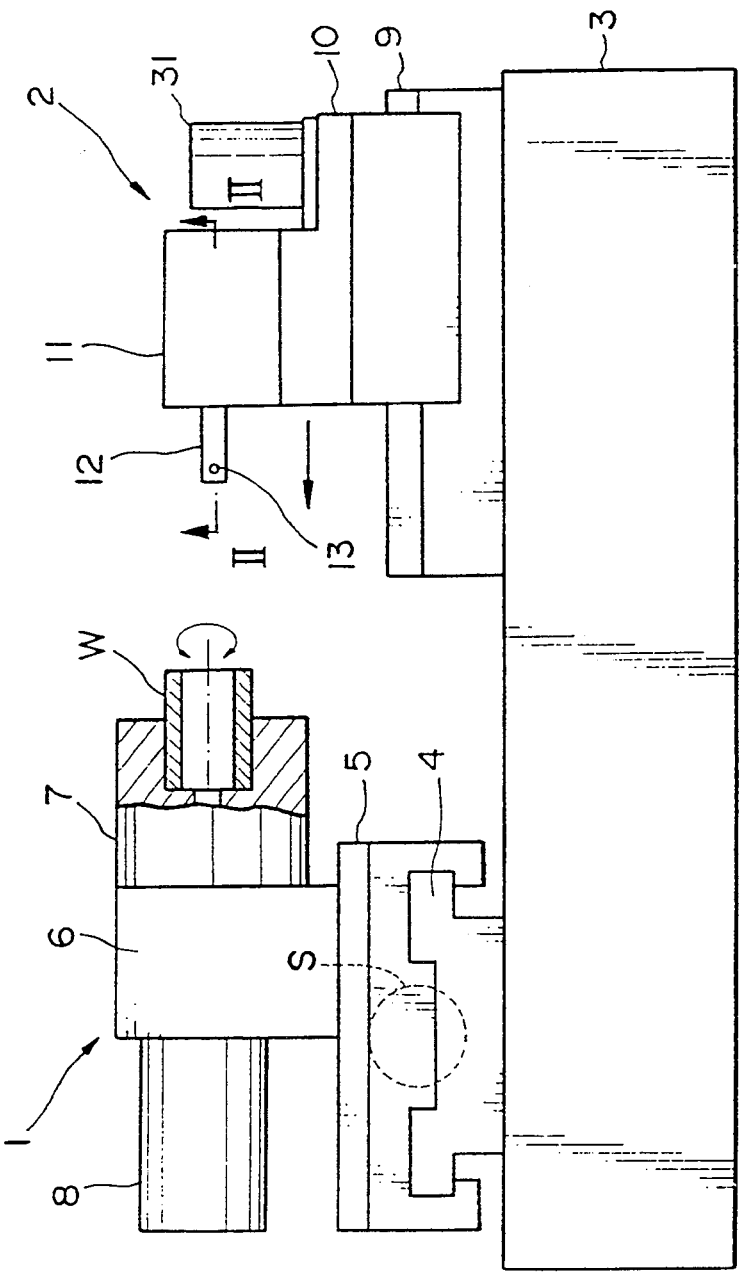
FIG. 1 is a side elevational view, partly in cross section, of a slotting apparatus according to an embodiment of the present invention.
Figure 12:
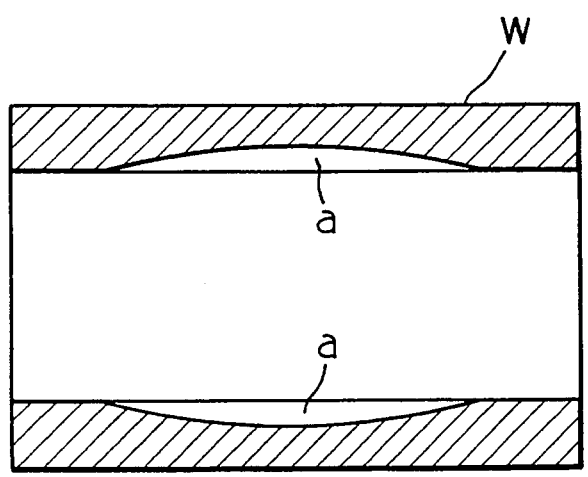
FIG. 12 is a longitudinal cross-sectional view of a tubular workpiece with slots defined therein.

As shown in FIG. 1, the slotting apparatus includes a workpiece holder unit 1 for detachably holding a sleeve W as a tubular workpiece to form a port slot a (see FIG. 12) therein, and a machining unit 2 for slotting the inner circumferential surface of the sleeve W to produce the port slot a therein. The workpiece holder unit 1 and the machining unit 2 are mounted on a base 3.

The workpiece holder unit 1 comprises a slide table 5 movably mounted on a guide rail 4 on the base 3 for movement in the transverse direction (normal to the sheet of FIG. 1) of the base 3, and a rotary holder 7 angularly movably supported on a support 6 vertically mounted on the slide table 5.

The rotary holder 7 has its axis extending parallel to the longitudinal direction (normal to the direction of movement of the slide table 5) of the base 3. The sleeve W is detachably inserted in and held by the rotary holder 7 in concentric relationship thereto. The rotary holder 7 is operatively coupled to a motor 8 through the support 6. In a slotting process, the rotary holder 7 is angularly moved about its own axis through a certain angular interval each time a port slot a (see FIG. 12) is formed in the inner circumferential surface of the sleeve W that is held by the rotary holder 7.

The slide table 5 is actuated by a fluid pressure cylinder S to move with the rotary holder 7 on the guide rail 4.

The machining unit 2 has a slide table 10 movably mounted on a guide rail 9 on the base 3 for movement toward the workpiece holder unit 1 parallel to the axis of the rotary holder 7. The slide table 10 supports a casing 11 fixedly thereon.

A tool holder 12, which is fixed to a tool support (described later) in the casing 11, projects out of the casing 11 toward the sleeve W inserted in and held by the rotary holder 7. A slotting tool or cutter 13 is secured to a lateral side of the distal end of the tool holder 12. The slide table 10 with the casing 11 thereon can be actuated by a fluid pressure cylinder or the like (not shown) to move on the guide rail 9. When the sleeve W is to be slotted, the tool holder 12 and the cutter 13 are inserted into the sleeve W held by the rotary holder 7 by moving the sliding table 10 toward the workpiece holder unit 1.

Figure 2:
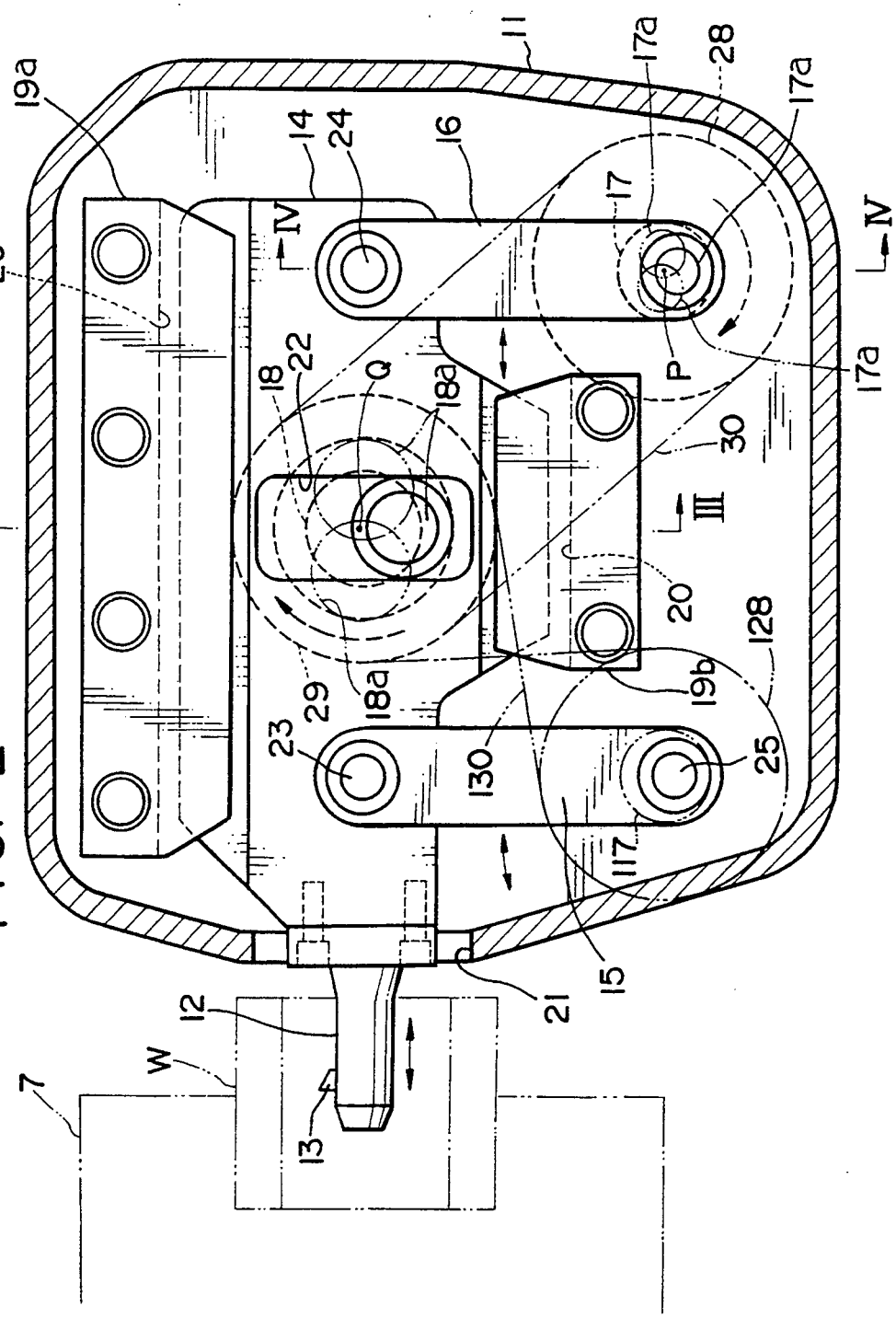
FIG. 2 is an enlarged cross-sectional view taken along line II—II of FIG. 1.

As shown in FIG. 2, the casing 11 houses therein a plate-like tool support 14, a pair of link arms 15, 16, a first drive crankshaft 17, a second drive crankshaft 18, and other components.

The tool support 14 is substantially in the form of a plate extending in a horizontal plane from an inner rear side of the casing 11 toward the rotary holder 7, and has opposite marginal side edges movably supported by respective guides 19a, 19b that are fixed to the casing 11.

Figure 3:
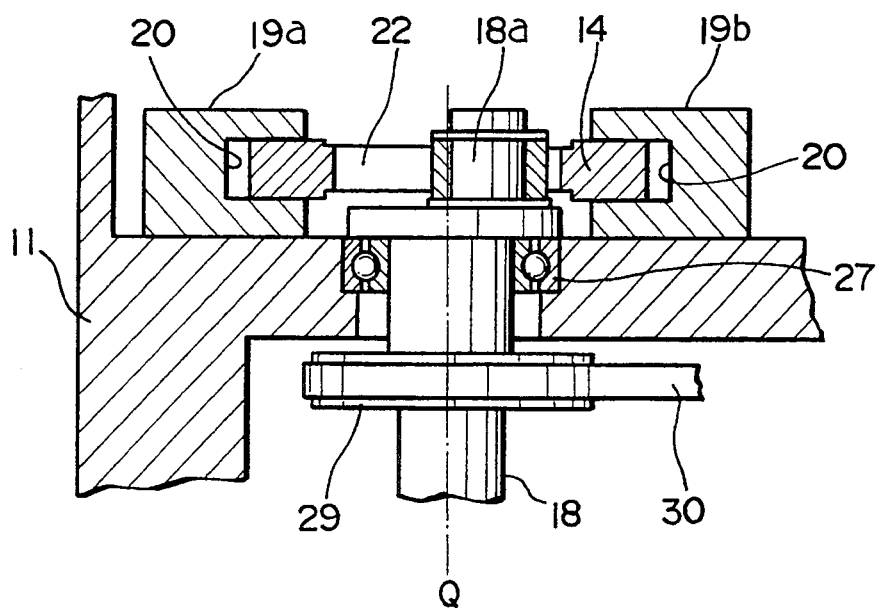
FIG. 3 is a cross-sectional view taken along line III—III of FIG. 2.

More specifically, as shown in FIGS. 2 and 3, the guides 19a, 19b are fixedly positioned in the casing 11 in confronting relationship to each other with the tool support 14 disposed therebetween. The guides 19a, 19b have respective guide grooves 20 defined in confronting inner surfaces thereof and extending in the longitudinal direction (i.e., the axial direction of the sleeve W held by the rotary holder 7) of the tool support 14. The marginal side edges of the tool support 14 are slidably inserted in the respectively guide grooves 20 with gaps left between the marginal side edges and the bottom surfaces of the guide grooves 20. Therefore, the tool support 14 is movable in the axial direction of the sleeve W held by the rotary holder 7 and is also slightly movable in the transverse direction thereof on account of the gaps between the marginal side edges and the bottom surfaces of the guide grooves 20.

As shown in FIG. 2, the guide 19b is shorter than the guide 19a. The guide 19a supports the corresponding marginal side edge of the tool support 14 substantially fully along its length, whereas the guide 19b supports a substantially central region of the corresponding marginal edge of the tool support 14.

In FIG. 2, the tool holder 12 is secured to the front end of the tool support 14 for movement in unison therewith. The tool holder 12 projects through a hole 21a defined in the front wall of the casing 11 toward the sleeve W. The cutter 13 fixed to the distal end of the tool holder 12 projects laterally from the side of the distal end of the tool holder 12.

The tool support 14 has a substantially rectangular oblong hole 22 extending in the transverse direction thereof. The second drive shaft 18 engages in the oblong hole 22.

The link arms 15, 16 are angularly movably supported on the respective front and rear ends of the tool support 14, and extend laterally therefrom on the side of the tool support 14 near the guide 19b. The link arms 15, 16 extend parallel to each other with the guide 19b disposed therebetween.

The link arm 15 connected to the front end of the tool support 14 has a distal end pivotally supported on the casing 11 by a fixed support shaft 25, so that the link arm 15 and the tool support 14 are angularly movable about the fixed support shaft 25 substantially in the longitudinal direction of the tool support 14.

Figure 4:
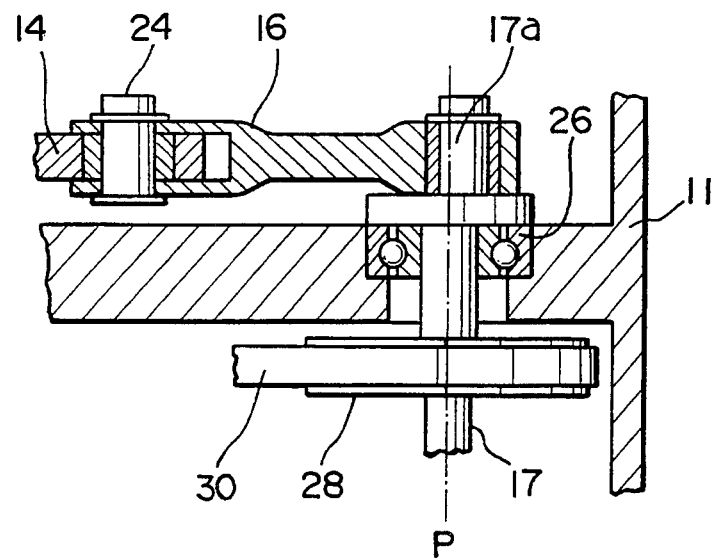
FIG. 4 is a cross-sectional view taken along line VI—VI of FIG. 2.

As shown in FIG. 4, the first drive crankshaft 17 is vertically positioned below the distal end of the link arm 16 that is connected to the rear end of the tool support 14. The first drive crankshaft 17 is rotatably supported on the casing 11 by a bearing 26. The distal end of the link arm 16 is pivotally supported on an eccentric support shaft 17a that is mounted on the upper end of the first drive crankshaft 17 out of alignment with an axis P about which the first drive crankshaft 17 is rotatable.

Therefore, the link arm 16 is angularly movable with the tool support 14 about the eccentric support shaft 17a substantially in the longitudinal direction of the tool support 14. As the first drive crankshaft 17 rotates about the axis P, the eccentric support shaft 17a revolves around the axis P.

As shown in FIGS. 2 and 3, the second drive crankshaft 18 is disposed below and vertically extends toward the oblong hole 22 in the tool support 14. The second drive crankshaft 18 is angularly movable supported on the casing 11 by a bearing 27. An eccentric drive shaft 18a is mounted on the upper end of the second drive crankshaft 18 out of alignment with an axis Q about which the second drive crankshaft 18 is rotatable. The eccentric drive shaft 18a is inserted in the oblong hole 22 for sliding movement in and along the oblong hole 22.

When the second drive crankshaft 18 is rotatable about the axis Q, the eccentric drive shaft 18a slidingly moves in and along the oblong hole 22 while at the same time revolving around the axis Q. At this time, the tool support 14 is reciprocally moved back and forth with the link arms 15, 16. The tool holder 12 and the cutter 13 that are inserted in the sleeve W are thus reciprocally moved with the tool support 14 axially along the inner circumferential surface of the sleeve W.

As shown in FIGS. 2 through 4, the first drive crankshaft 17 and the second drive crankshaft 18 are operatively coupled to each other for synchronized angular movement in one direction by an interlinking means which comprises pulleys 28, 29 fixedly fitted over the respective crankshafts 17, 18 and a pulley belt 30 trained around the pulleys 28, 29. The eccentric support shaft 17a and the eccentric drive shaft 18a are positioned relatively to each other such that they revolve around the respective axes P, Q in phase with each other when the drive crankshafts 17, 18 are rotated synchronously with each other.

More specifically, when the eccentric drive shaft 18a revolves into a position (foremost position) closest to the rotary holder 7, the eccentric support shaft 17a also revolves into a position (foremost position) closest to the rotary holder 7. Conversely, when the eccentric drive shaft 18a revolves into a position (rearmost position) farthest from the rotary holder 7, the eccentric support shaft 17a also revolves into a position (rearmost position) farthest from the rotary holder 7.

As shown in FIG. 1, a motor 31 is fixedly mounted on the slide table 10 behind the casing 11 for angularly moving the second drive crankshaft 18 through gears or pulleys (not shown). In this embodiment, the motor 31 rotates the drive crankshafts 18, 17 clockwise in FIG. 2.

Operation of the slotting apparatus of the above structure will be described below with reference to FIGS. 1, 2, and 5 through 7.

To form a port slot a (see FIG. 12) in the inner circumferential surface of the sleeve W, the sleeve W is inserted into the rotary holder 7 of the workpiece holder unit 1, and then the machining unit 2 is moved toward the sleeve W until the tool holder 12 is inserted, together with the cutter 13, into a desired position in the sleeve W.

Then, the motor 31 of the machining unit 2 is energized to rotate the drive crankshafts 18, 17 synchronously clockwise in FIG. 2 for thereby reciprocally angularly moving the tool support 14 about the fixed support shaft 25 and the eccentric support shaft 17a substantially in the longitudinal direction of the sleeve W.

At this time, the cutter 13 reciprocally moves, together with the tool holder 12 and the tool support 14, in the sleeve W along the inner circumferential surface thereof while following a path described below.

Figure 5:
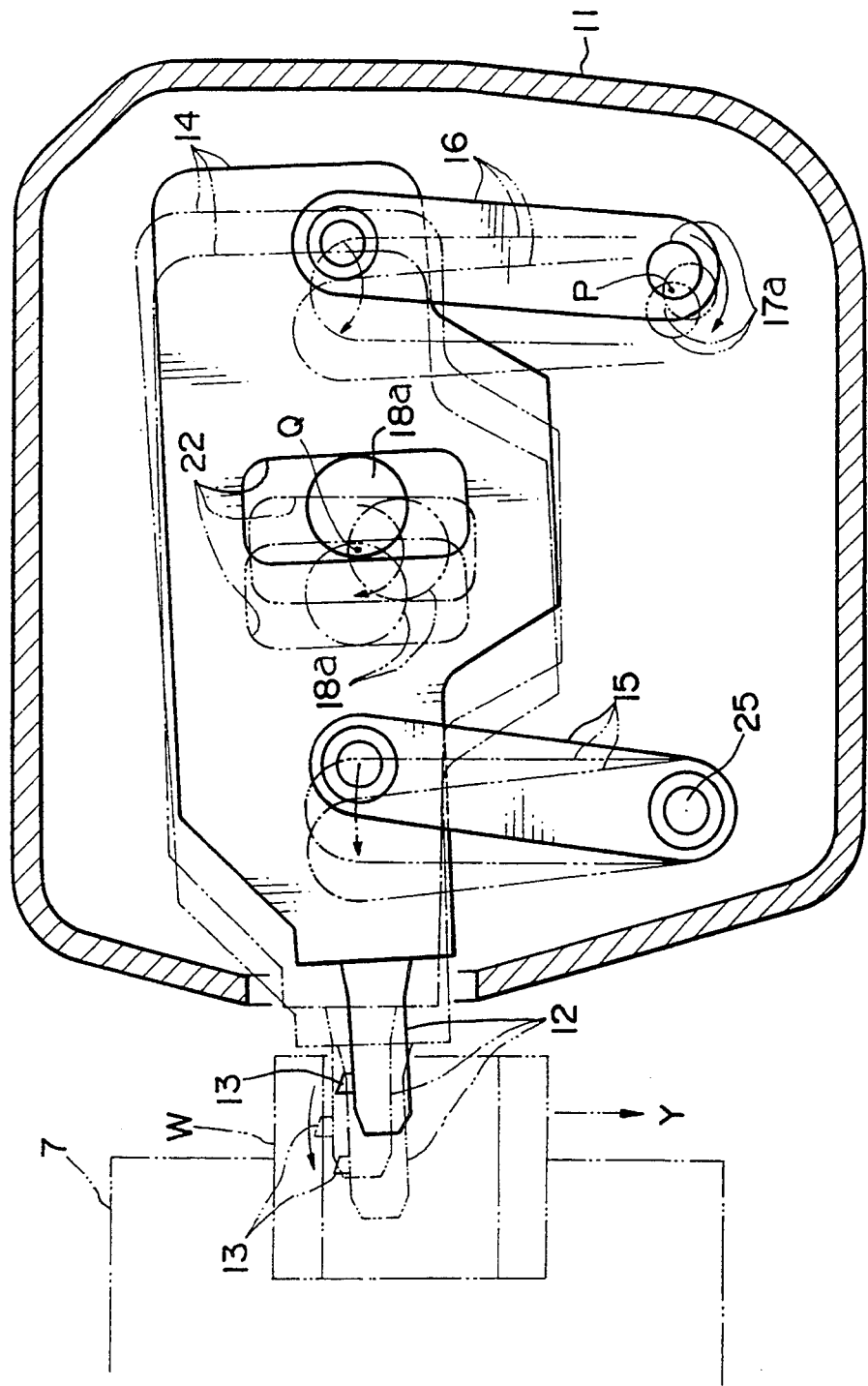
FIGS. 5, 6, and 7 are views showing the manner in which the slotting apparatus operates.

As shown in FIG. 5, when the tool support 14 moves forwardly from the rear side of the casing 11 toward the sleeve W, the eccentric drive and support shafts 18a, 17a synchronously revolve clockwise about the respective axes P, Q of the drive crankshafts 18, 17 from the rearmost positions toward the foremost positions.

At this time, since the eccentric drive shaft 18a slidably engages in the oblong hole 22, the tool support 14 angularly moves toward the sleeve W about the fixed support shaft 25 and the eccentric support shaft 17a by which the distal ends of the link arms 15, 16 are pivotally supported. The eccentric support shaft 17a about which the link arm 16 angularly moves revolves clockwise from the rearmost position to the foremost position. At this time, in a first half of the revolving movement of the eccentric support shaft 17a, the eccentric support shaft 17a moves in a direction away from the tool support 14. Therefore, the rear end of the tool support 14 is caused by the link arm 16 to move toward the eccentric support shaft 17a, so that the cutter 13 swings while moving toward the inner circumferential surface of the sleeve W. In the latter half of the revolving movement of the eccentric support shaft 17a, since the eccentric support shaft 17a moves in a direction toward the tool support 14, the rear end of the tool support 14 is caused by the link arm 16 to move away from the eccentric support shaft 17a. Thus, the cutter 13 swings while moving away from the inner circumferential surface of the sleeve W.

Consequently, when the tool support 14 moves forwardly toward the sleeve W, the cutter 13 follows an arcuate path Xa (FIG. 7) in which it moves progressively toward and away from the inner circumferential surface of the sleeve W as it moves therealong.

Figure 6:
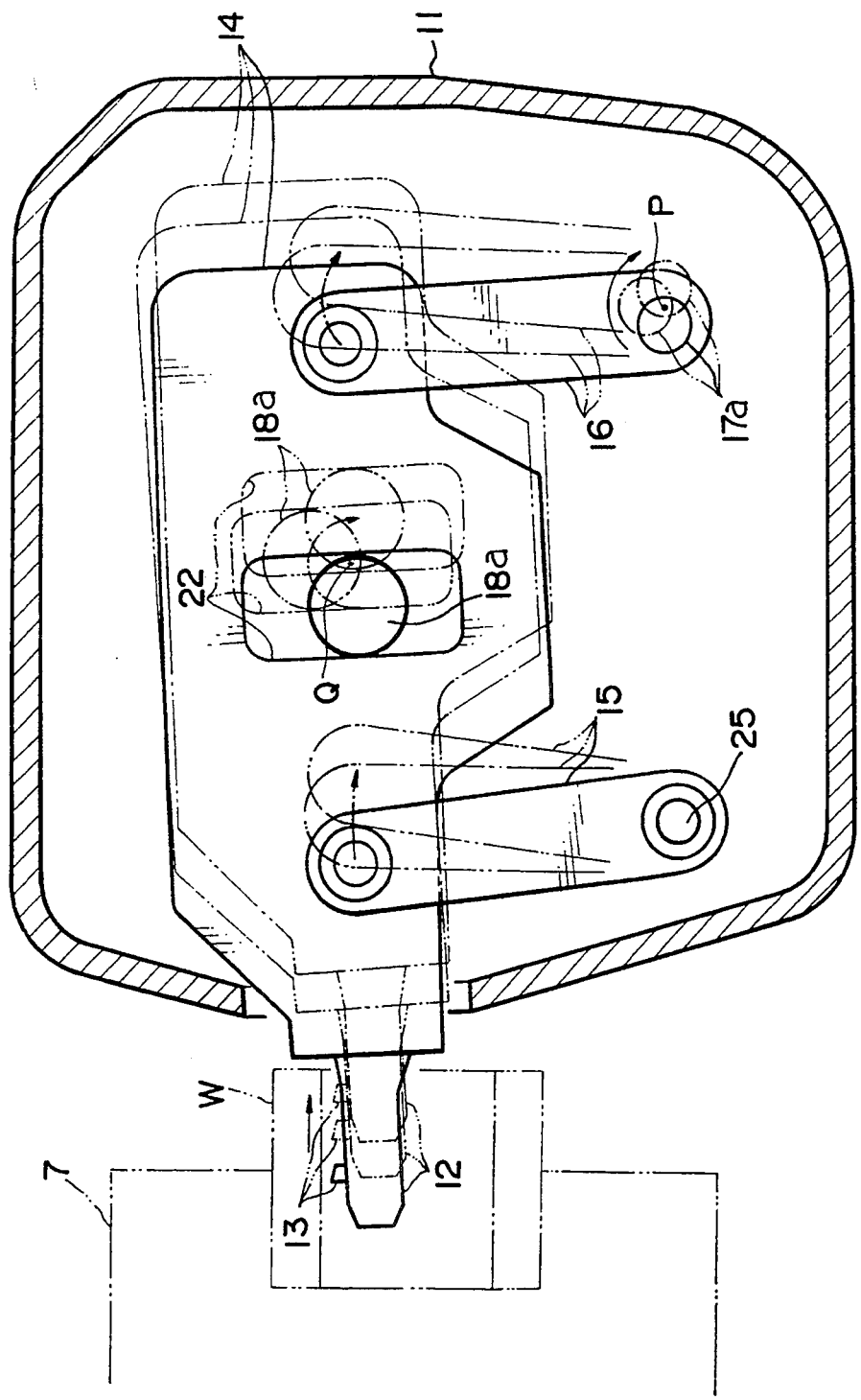

As shown in FIG. 6, when the tool support 14 moves rearwardly from the sleeve W toward the rear side of the casing 11, the eccentric drive and support shafts 18a, 17a synchronously revolve clockwise about the respective axes P, Q of the drive crankshafts 18, 17 from the foremost positions toward the rearmost positions.

At this time, the tool support 14 angularly moves toward the rear side of the casing 11 about the fixed support shaft 25 and the eccentric support shaft 17a. The eccentric support shaft 17a revolves clockwise from the foremost position to the rearmost position. At this time, in a first half of the revolving movement of the eccentric support shaft 17a, the eccentric support shaft 17a moves in a direction toward the tool support 14. Therefore, the rear end of the tool support 14 is caused by the link arm 16 to move away the eccentric support shaft 17a. In the latter half of the revolving movement of the eccentric support shaft 17a, the eccentric support shaft 17a moves in a direction away from the tool support 14, and hence the rear end of the tool support 14 is caused by the link arm 16 to move toward the eccentric support shaft 17a, canceling the angular movement of the tool support 14.

Consequently, when the tool support 14 moves rearwardly away from the sleeve W, the cutter 13 follows a straight path Xb (FIG. 7) in which it moves axially along the inner circumferential surface of the sleeve W.

Accordingly, upon the reciprocating movement of the tool support 14, the cutter 13 reciprocates along a substantially bow-shaped path X (FIG. 7) along the inner circumferential surface of the sleeve W.

While the cutter 13 is reciprocating along the path X, the workpiece holder unit 1 is moved along the guide rail 4 to move the inner circumferential surface of the workpiece W, which confronts the cutter 13, progressively toward the cutter 13 as indicated by the arrow Y (FIG. 5).

When the cutter 13 moves forwardly along the arcuate path Xa, the cutter 13 gradually cuts off the inner circumferential surface of the sleeve W, forming a port slot a (see FIG. 12) therein. As the cutter 13 moves back along the straight path Xb, it is spaced from the slotted inner circumferential surface and moves therealong back to its starting position in the axial direction of the sleeve W.

After one port slot a has been formed in the inner circumferential surface of the sleeve W, the cutter 13 is spaced from the inner circumferential surface of the sleeve W toward the axis thereof. Then, the rotary holder 7 is angularly moved, together with the sleeve W, by the motor 8 until the cutter 13 is confronted by another region of the inner circumferential surface of the sleeve W where a new port slot a is to be formed. The new port slot a is then formed in the same manner as described above. The above process is repeated to form a plurality of angularly spaced port slots a in the sleeve W.

In the above slotting apparatus, the cutter 13 for slotting the inner circumferential surface of the sleeve W to form cross-sectionally arcuate port slots a is reciprocally moved by a relatively simple and small mechanism which is composed of the tool support 14, the link arms 15, 16, and the drive crankshafts 17, 18. When the cutter 13 moves back without cutting off the inner circumferential surface of the sleeve W, the cutter 13 linearly moves along the inner circumferential surface of the sleeve W. Therefore, the interval that the cutter 13 and the tool holder 12 move toward the axis of the sleeve W when the cutter 13 does not cut off the sleeve W is minimized. Therefore, the diameter of the tool holder 12 is increased for greater rigidity without interfering with the reciprocating movement of the cutter 13. Even if large loads are imposed on the cutter 13 when it cuts off the sleeve W, the cutter 13 and the tool holder 12 are rigid enough to withstand the applied loads.

In the above embodiment, the sleeve W is slotted by the cutter 13 when the tool support 14 angularly moves in the forward direction toward the sleeve W. However, the slotting apparatus may be arranged so that the cutter 13 will slot the sleeve W when the tool support 14 angularly moves in the rearward direction away from the sleeve W. Such a modification can be achieved as follows: When the drive crankshafts 17, 18 are angularly moved in the direction opposite to the direction described in the above embodiment, the cutter 13 moves back along a path that is a reversal of the illustrated path. Therefore, the drive crankshafts 17, 18 are rotated in the direction opposite to the direction described in the above embodiment, and the cutting edge of the cutter 13 is directed back in the direction in which the tool support 14 moves rearwardly away from the sleeve W.

In the above embodiment, the distal end of the front link arm 15 is pivotally supported on the fixed shaft 25, and the distal end of the rear link arm 16 revolves around the eccentric support shaft 17a, for causing the cutter 13 to follow the substantially bow-shaped path X. However, the distal end of the front link arm 15 may revolve an eccentric support shaft and the distal end of the rear link arm 16 may be pivotally supported on a fixed shaft, for also causing the cutter 13 to follow a substantially bow-shaped path. To achieve such a modification, as shown in FIG. 2, the distal end of the link arm 15 is pivotally supported on a drive crankshaft 117 identical to the drive crankshaft 17, and the distal end of the link arm 16 is pivotally supported on a fixed shaft (not shown). Furthermore, a pulley belt 130 is trained in an X-shaped crossed fashion around a pulley 128 fixedly fitted over the drive crankshaft 117 and the pulley 29 on the drive crankshaft 18, so that the drive crankshafts 117, 18 can rotate synchronously in opposite directions. Intermeshing gears may alternatively be mounted on the respective drive crankshafts 117, 18 for rotating the drive crankshafts 117, 18 synchronously in opposite directions.

With such a modified arrangement, when the tool support 14 angularly moves forwardly toward the sleeve W, the distal end of the link 15 revolves to move the front end of the tool support 14 progressively toward and away from the inner circumferential surface of the sleeve W, and when the tool support 14 angularly moves rearwardly away from the sleeve W, the front end of the tool support 14 moves in a manner to cancel the angular movement thereof. Therefore, the cutter 13 follows a substantially bow-shaped path as the tool support 14 reciprocally moves.

In the above illustrated embodiment, the eccentric drive shaft 18a and the eccentric support shaft 17a are initially phased to each other for causing the cutter 13 to follow the substantially bow-shaped path X. However, these shafts 18a, 17b may be in different initial phases to cause the cutter 13 to follow the substantially bow-shaped path X. In such a modification, the eccentric drive and support shafts 18a, 17a are phased such that when the eccentric drive shaft 18a is in the rearmost position, the eccentric support shaft 17a is in the foremost position, and the drive crankshafts 17, 18 are rotated synchronously in opposite directions.

In the above illustrated embodiment, the workpiece holder unit 1 is moved to cause the inner circumferential surface of the sleeve W held by the rotary holder 7 to approach the cutter 13 for cutting off the sleeve W. However, the machining unit 2 may be moved by a fluid pressure cylinder or the like in order to move the cutter 13 toward the inner circumferential surface of the sleeve W for slotting the sleeve W.

A slotting apparatus according to another embodiment of the present invention will be described below with reference to FIGS. 8 through 10.

Figure 7:
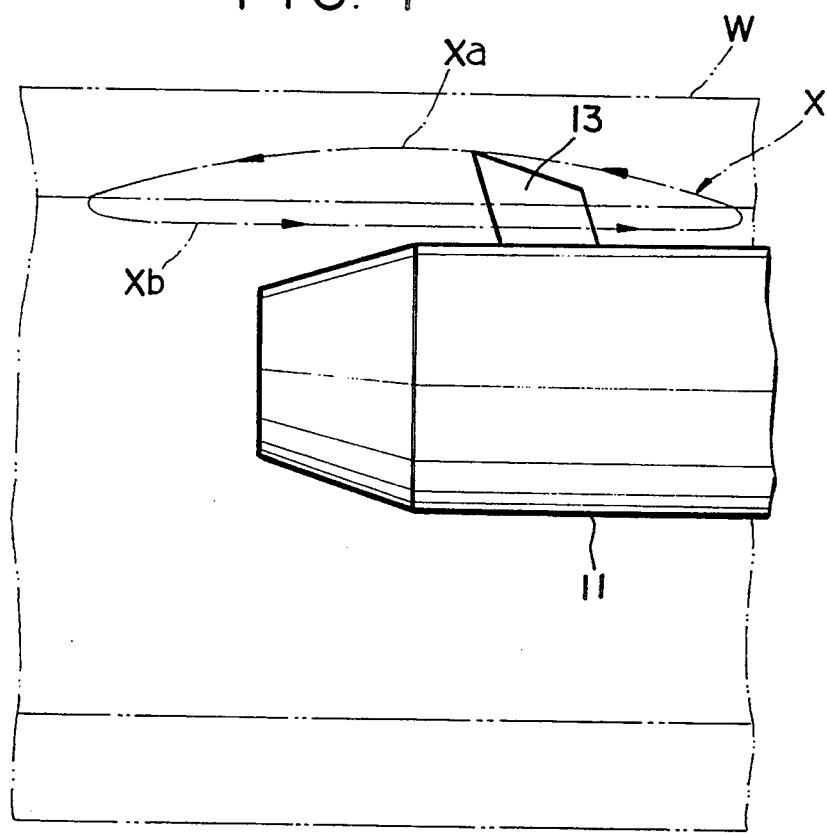
Figure 8:
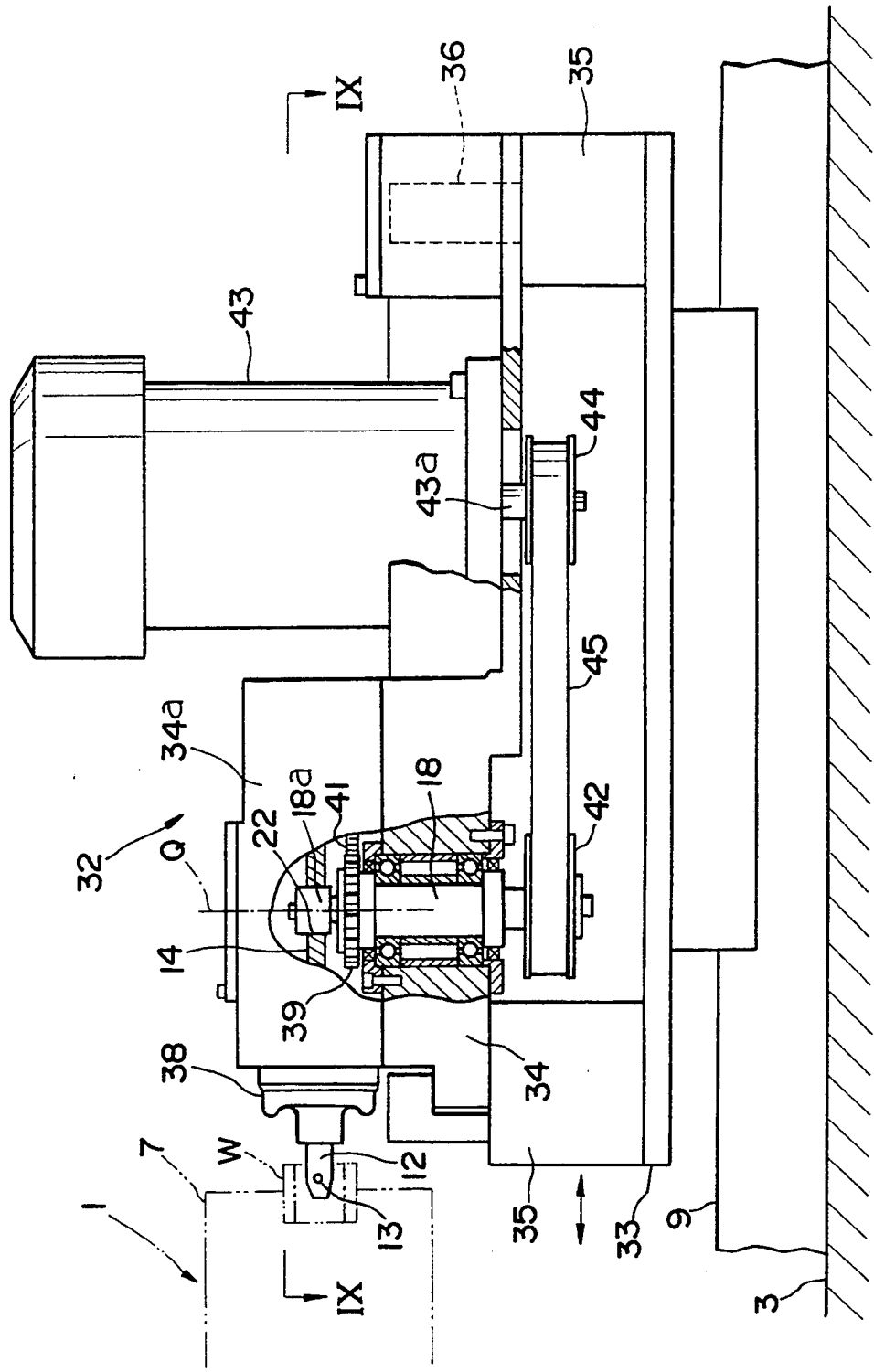
FIG. 8 is a fragmentary side elevational view, partly in cross section, of a slotting apparatus according to another embodiment of the present invention.
Figure 9:
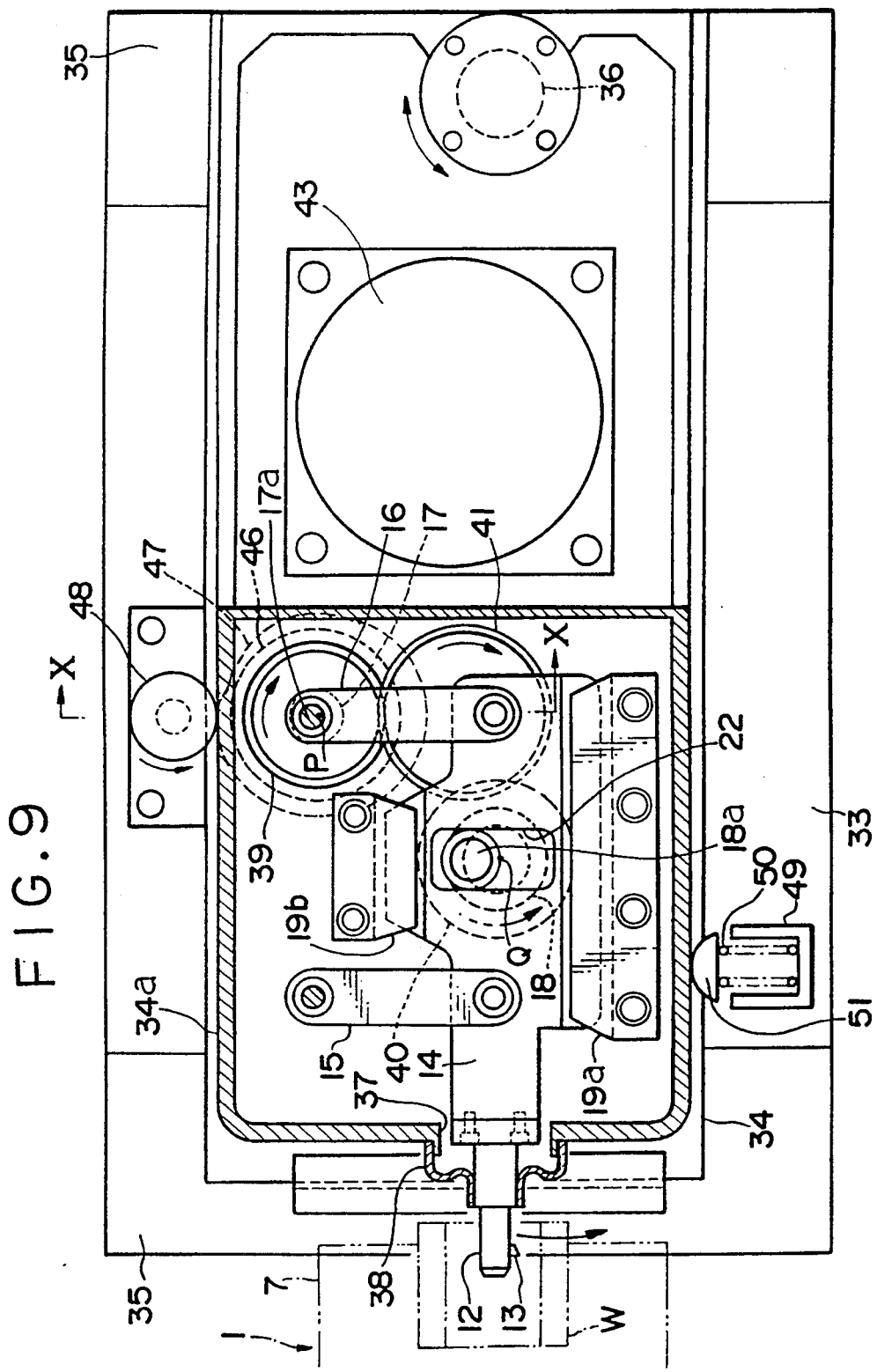
FIG. 9 is a cross-sectional view taken along line IX—IX of FIG. 8.
Figure 10:
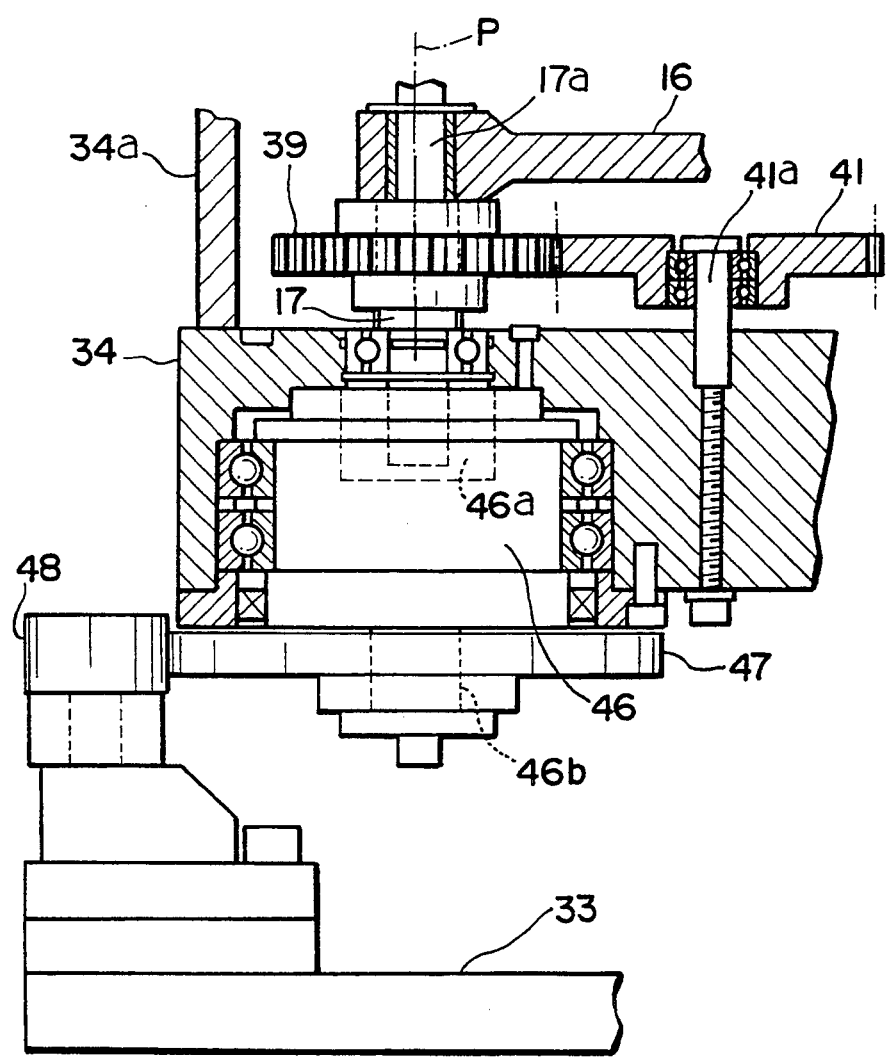
FIG. 10 is a cross-sectional view taken along line X—X of FIG. 9.

Those parts shown in FIGS. 8 through 10 which are identical to those shown in FIGS. 1 through 7 are denoted by identical reference characters.

As shown in FIG. 8, the slotting apparatus includes a machining unit 32 for forming port slots a in the inner circumferential surface of a sleeve W held by a rotary holder 7 of a workpiece holder unit 1. The machining unit 32 comprises a slide table 33 movably mounted on a guide rail 9 on a base 3 and slidable by a fluid pressure cylinder (not shown) toward and away from the sleeve W held by the rotary holder 7, and a casing 34 mounted on the slide table 33.

The casing 34 is horizontally slidably supported by support blocks 35 on front and rear ends of the slide table 33. The casing 34 is also pivotally mounted on a support shaft 36 vertically disposed on the rear support block 35 for horizontal swinging movement about the support shaft 36.

The casing 34 includes a front case 34a which houses, as shown in FIG. 9, a tool support 14 supporting a tool holder 12 with a cutter 13 fixed to a side thereof, a pair of link arms 15, 16 for supporting the tool support 14 for swinging movement toward and away from the workpiece holder unit 1, guides 19a, 19b for guiding the swinging movement of the tool support 14, and other components. The tool holder 12 projects out of the case 34a toward the sleeve W held by the rotary holder 7 through a hole 37 defined in the front wall of the case 34a. The above structural details are basically the same as those of the slotting apparatus according to the previous embodiment shown in FIGS. 1 through 7. An expandable and contractable protective boot 38 of an elastomeric material such as synthetic resin is disposed over a shank of the tool holder 12 and extends between the tool holder 12 and the front wall of the case 34a in covering relationship to the hole 37 for thereby concealing the hole 37 from the exterior.

As shown in FIGS. 8 through 10, a drive crankshaft 18 for angularly moving the tool support 14 back and forth and a drive crankshaft 17 by which the distal end of the link arm 16 is pivotally supported for revolving movement are rotatably supported below the tool support 14 and the distal end of the link arm 16, respectively, by the casing 34 beneath the case 34a. The drive crankshaft 18 has an eccentric drive shaft 18a on its upper end which slidably engages in an oblong hole 22 defined in the tool support 14. The drive crankshaft 17 has an eccentric drive shaft 17a on its upper end by which the distal end of the link arm 16 is pivotally supported for revolving movement. The above structural details are also basically the same as those of the slotting apparatus according to the previous embodiment.

To the drive crankshafts 17, 18, there are fixed respective gears 39, 40 concentrically with their axes P, Q for rotation therewith, the gears 39, 40 being housed in the case 34a. The gears 39, 40 are held in mesh with each other through an idle gear 41 that is rotatably supported on a support shaft 41a (see FIG. 10) vertically mounted on the bottom of the case 34a.

Therefore, when the drive crankshaft 18 is rotated, the drive crankshaft 17 is also rotated in synchronism with the drive crankshaft 18 in the same direction.

As shown in FIG. 8, the drive crankshaft 18 extends through the bottom of the case 34a, or the casing 34, downwardly toward the slide table 33, and a driven pulley 42 is fixedly mounted on the lower end of the drive crankshaft 18. The driven pulley 42 is operatively coupled by a pulley belt 45 to a drive pulley 44 that is fixedly mounted on the lower end of a drive shaft 43a of a motor 43 that is fixedly mounted on the casing 34 between the case 34a and the support shaft 36.

As shown in FIG. 10, the lower end of the drive crankshaft 17 is coupled to an input section 46a of a speed reducer 46 that is fixed to a lower portion of the casing 34 concentrically with the drive crankshaft 17.

The speed reducer 46 has an output shaft 46b projecting downwardly from the casing 34, and a substantially disk-shaped cam 47 with a predetermined cam profile is fixedly attached to the output shaft 46a. A roller cam follower 48 that is angularly movably supported on the slide table 33 laterally of the casing 34 is held in rolling contact with the outer cam surface of the cam 47 As shown in FIG. 9, a compression coil spring 50 is pressed through a presser 51 against a side wall of the casing 34 which is opposite to the cam follower 48, the compression coil spring 50 being retained by a spring retainer 49 mounted on the slide table 33. The casing 34 is resiliently urged by the spring 50 to press the cam 47 against the cam follower 48 at all times.

Therefore, when the cam 47 rotates, the casing 34 angularly moves about the support shaft 36 on the slide table 33.

The slotting apparatus shown in FIGS. 8 through 10 operates as follows:

To form a port slot a (see FIG. 12) in the inner circumferential surface of the sleeve W, the sleeve W is inserted into the rotary holder 7 of the workpiece holder unit 1, and then the machining unit 32 is moved toward the sleeve W until the tool holder 12 is inserted, together with the cutter 13, into a desired position in the sleeve W.

Then, the motor 43 of the machining unit 32 is energized to rotate the drive crankshaft 18 counterclockwise in FIG. 9 through the drive pulley 44, the pulley belt 45, and the driven pulley 42 for thereby rotating the drive crankshaft 17 synchronously counterclockwise through the gears 39~41.

In response to the rotation of the drive crankshafts 17, 18, the tool support 14 is caused to angularly move reciprocally for reciprocally moving the cutter 13 along a substantially bow-shaped path X (FIG. 7).

Concurrent with this, the rotation of the drive crankshaft 17 is transmitted through the speed reducer 46 to the cam 47, which is rotated in the same direction as the drive crankshaft 17 at a speed substantially lower than the speed of rotation of the drive crankshaft 17.

When the cam 47 is thus rotated, the casing 34 angularly moves, together with the tool support 14 and other associated components, about the support shaft 36.

The cam profile of the cam 47 is selected to angularly move the casing 34 such that when the cam 47 makes a substantially first half of its revolution after it has starting rotating, the cutter 13 progressively approaches the confronting inner circumferential surface of the sleeve W while following the path X, and when the cam 47 makes a substantially latter half of its revolution, the cutter 13 moves progressively away from inner circumferential surface of the sleeve W back to its starting position. Therefore, in the substantially first half of the revolution of the cam 47, the cutter 13 gradually cuts off the inner circumferential surface of the sleeve W, and in the substantially latter half of the revolution of the cam 47, the cutter 13 moves away from the slotted inner circumferential surface of the sleeve W. The cam profile of the cam 47 and the speed reduction ratio of the speed reducer 46 are selected such that a desired port slot a (see FIG. 12) can be cut by the cutter 13 as it is moved by the cam 47. Consequently, the desired pot slot a can appropriately be cut in the inner circumferential surface of the sleeve W by the cutter 13.

During the slotting process, chips are scattered from the sleeve W by the cutter 13. According to the present embodiment, the boot 38 extending between the tool holder 12 and the case 34a shields the hole 37 in the case 34a from the exterior for preventing any chips from entering the hole 37. Therefore, the tool support 14, the drive crankshafts 17, 18, and other associated components for actuating the cutter 13 can smoothly operate without being disturbed by chips which would otherwise find their way into the case 34a.

As described above, the cutter 13 for slotting the inner circumferential surface of the sleeve W to form cross-sectionally arcuate port slots a is reciprocally moved by a relatively simple and small mechanism. The cam 47 for angularly moving the casing 34 is driven by the drive crankshaft 17 of such a mechanism so as to move the cutter 13 toward and away from the inner circumferential surface of the sleeve W. With such an arrangement, port slots a can efficiently be produced, and the overall slotting apparatus is relatively simple and small.

Figure 11:
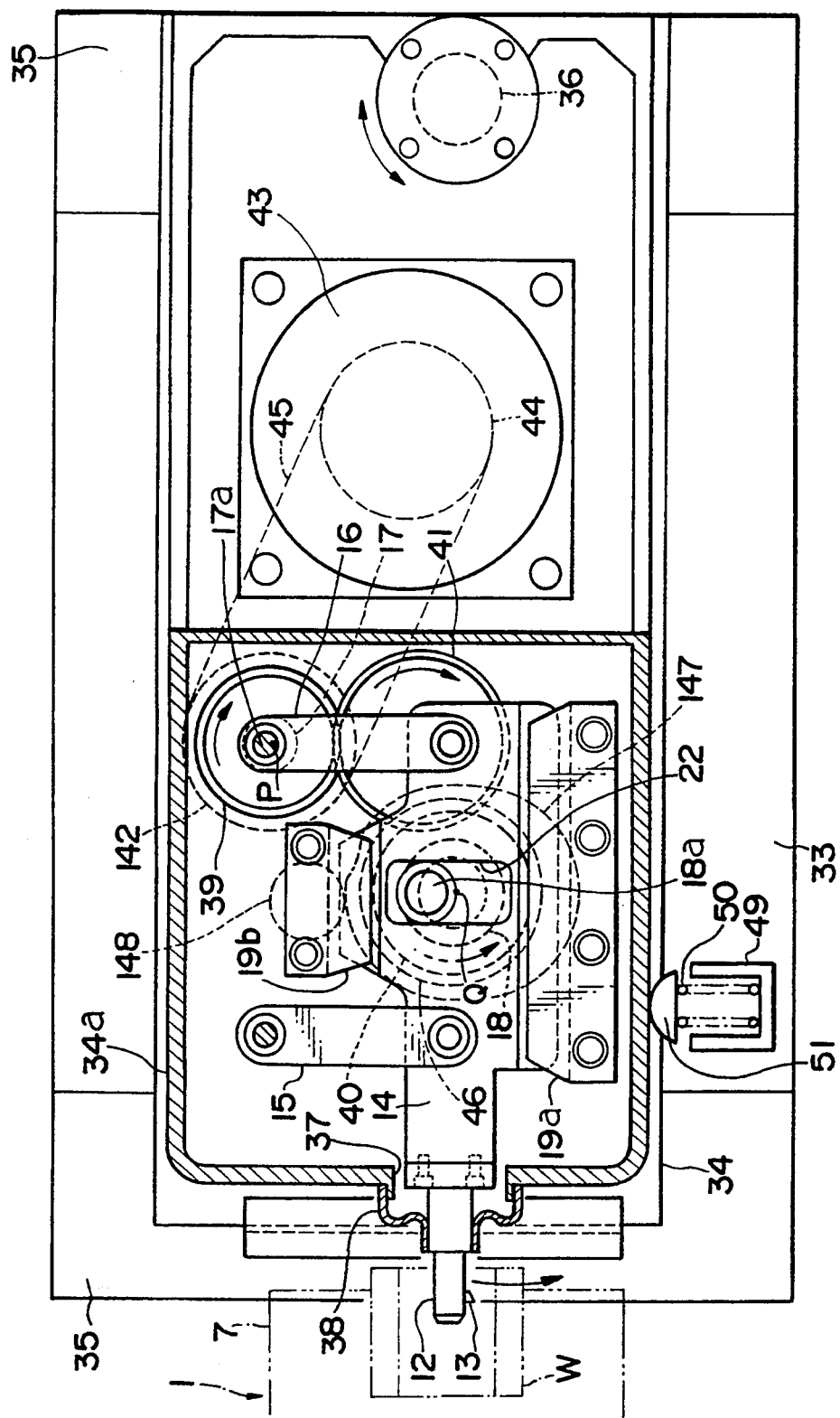
FIG. 11 is a plan view, partly in cross section, of a modification of the slotting apparatus shown in FIG. 9.

While the cam 47 is operatively coupled to the drive crankshaft 17 in the illustrated embodiment, it may be operatively coupled to the drive crankshaft 18. In such a modification, as shown in FIG. 11, a cam 147 identical to the cam 47 is operatively coupled to the drive crankshaft 18 through a speed reducer 46 below the case 34a, and a cam follower 148 identical to the cam follower 48 is angularly movably supported on the slide table 33 below the case 34a in engagement with the cam 147. A driven pulley 142 is fixedly mounted on the drive crankshaft 17 to which the distal end of the link arm 16 is attached for revolving movement, and is operatively connected to the drive pulley 44 of the motor 43 through the pulley belt 45.

According to the modified slotting apparatus, when the drive crankshaft 17 is rotated by the motor 43 and the drive crankshaft 18 is synchronously rotated through the gears 49~41, the tool support 14 reciprocally moves to cause the cutter 13 to follow a substantially bow-shaped path. At this time, the rotation of the drive crankshaft 18 is transmitted through the speed reducer 46 to the cam 147, which rotates at a speed substantially lower than the speed of rotation of the drive crankshafts 17, 18 while being held in engagement with the cam follower 148. The cam 147 has an outer profile shape selected to angularly move the casing 34 about the support shaft 36 to cause the cutter 13 to move progressively toward and away from the inner circumferential surface of the sleeve W.

Although certain preferred embodiments of the present invention have been shown and described in detail, it should be understood that various changes and modifications may be made therein without departing from the scope of the appended claims.

What is claimed is:

1. A slotting apparatus for producing a slot of substantially arcuate cross section axially in an inner circumferential surface of a tubular workpiece held in position, comprising:
   a tool support supporting on a distal end thereof a slotting tool to be inserted into the tubular workpiece for slotting the same;
   a casing, said tool support and said slotting tool being supported in said casing for movement in axial and transverse directions of the tubular workpiece;
   first and second link arms housed in said casing and spaced from each other substantially in the axial direction of the tubular workpiece, said first and second link arms being pivotally mounted at respective first ends thereof on said tool support and extending from said tool support;

a support shaft, one of said first and second link arms having a second end pivotally supported on said casing through said support shaft;

a first drive crankshaft rotatably supported on said casing, the other of said first and second link arms having a second end supported on said first drive crankshaft; and a second drive crankshaft rotatably supported on said casing, for rotation in synchronism with said first drive crankshaft;

said tool support being supported by said first and second link arms for angular movement about said support shaft and said first drive crankshaft, respectively, to cause the slotting tool to move along the inner circumferential surface of the tubular workpiece;

said second drive crankshaft engaging said tool support for causing, upon rotation thereof, the tool support to move reciprocally substantially in the axial direction of the tubular workpiece;

said first drive crankshaft being operatively coupled to said second drive crankshaft for synchronized rotation to cause the distal end of said second link arm to revolve around the axis of said second drive crankshaft;

wherein when said tool support is moved in one direction axially with respect to the tubular workpiece upon rotation of said second drive crankshaft and revolution of the second end of the other of said first and second link arms, said slotting tool follows a path to cut off substantially arcuately the inner circumferential surface of the tubular workpiece, and when said tool support is moved in an opposite direction axially with a respect to the tubular workpiece, said slotting tool follows a path transversely spaced from the inner circumferential surface of the tubular workpiece and substantially parallel to the axis of the tubular workpiece.

2. A slotting apparatus according to claim 1, further including a pair of guides fixedly mounted in said casing on opposite sides of said tool support, said guides having respective guide grooves defined in inner surfaces thereof and extending in the direction in which said tool support is movable, said tool support having opposite marginal side edges slidably fitted in said guide grooves, respectively, whereby said tool support is supported on said casing through said guides for movement in the axial and transverse directions of the tubular workpiece.

3. A slotting apparatus according to claim 1, wherein said first drive crankshaft has an eccentric shaft out of alignment with the axis thereof, said second end of the second link arm being pivotally supported on said eccentric shaft.

4. A slotting apparatus according to claim 1, wherein said tool support has an oblong hole defined therein at a position corresponding to said second drive crankshaft and extending substantially perpendicularly to the direction in which said tool support is reciprocally movable, said second drive crankshaft having an eccentric shaft out of alignment with the axis thereof, said eccentric shaft slidably engaging in said oblong hole.

5. A slotting apparatus according to claim 4, wherein said first drive crankshaft has an eccentric shaft out of alignment with the axis thereof, one of said first and second link arms which is positioned more remotely from the tubular workpiece than the other link arm, being pivotally supported on said eccentric shaft of said first drive crankshaft, said eccentric shafts of the first and second drive crankshafts being positioned relatively to each other such that when the eccentric shaft of the second drive crankshaft revolves around the axis of the second drive crankshaft into a position farthest from the tubular workpiece upon rotation of said second drive crankshaft, the eccentric shaft of said first drive crankshaft revolves around the axis of the first drive crankshaft into a position farthest from the tubular workpiece upon rotation of said first drive crankshaft in synchronism with said second drive crankshaft, further including an interlinking means, interconnecting said first and second drive crankshafts, for rotating the first and second drive crankshafts synchronously in one direction.

6. A slotting apparatus according to claim D, wherein said interlinking means comprises a pair of pulleys mounted on said first and second drive crankshafts, respectively, for rotation therewith about the axes thereof, and a pulley belt trained around said pulleys.

7. A slotting apparatus according to claim 5, wherein said interlinking means comprises a pair of gears mounted on said first and second drive crankshafts, respectively, for rotation therewith about the axes thereof, and an idle gear meshing with said gears and rotatably supported in said casing.

8. A slotting apparatus according to claim 4, wherein said first drive crankshaft has an eccentric shaft out of alignment with the axis thereof, one of said first and second link arms which is positioned more closely to the tubular workpiece than the other link arm, being pivotally supported on said eccentric shaft of said first drive crankshaft, said eccentric shafts of the first and second drive crankshafts being positioned relatively to each other such that when the eccentric shaft of the second drive crankshaft revolves around the axis of the second drive crankshaft into a position farthest from the tubular workpiece upon rotation of said second drive crankshaft, the eccentric shaft of said first drive crankshaft revolves around the axis of the first drive crankshaft into a position farthest from the tubular workpiece upon rotation of said first drive crankshaft in synchronism with said second drive crankshaft, further including an interlinking means, interconnecting said first and second drive crankshafts, for rotating the first and second drive crankshafts synchronously in opposite directions, respectively.

9. A slotting apparatus according to claim 8, wherein said interlinking means comprises a pair of pulleys mounted on said first and second drive crankshafts, respectively, for rotation therewith about the axes thereof, and a pulley belt trained in a crossed fashion around said pulleys.

10. A slotting apparatus according to claim 1, further including drive means for rotating one of said first and second drive crankshafts.

11. A slotting apparatus according to claim 10, wherein said drive means comprises a motor fixedly mounted on said casing and having a drive shaft, a drive pulley mounted on said drive shaft of the motor, a driven pulley mounted on one of said first and second drive crankshafts for rotation therewith about the axis thereof, and a pulley belt trained around said drive and driven pulleys.

12. A slotting apparatus according to claim 1, further including a workpiece holder for holding the tubular workpiece and moving the inner circumferential surface of the tubular workpiece confronting the slotting tool toward the slotting tool when the tubular workpiece is to be slotted, and moving means for moving said workpiece holder to move the inner circumferential surface of the tubular workpiece held by said workpiece holder progressively toward said slotting tool when the tubular workpiece is slotted.

13. A slotting apparatus according to claim 1, further including a base, said casing being movably supported on said base for movement of said slotting tool toward the inner circumferential surface of the tubular workpiece when the tubular workpiece is to be slotted, and moving means for moving said casing to move said slotting tool progressively toward and away from the inner circumferential surface of the tubular workpiece when the tubular workpiece is slotted.

14. A slotting apparatus according to claim 13, further including a support shaft vertically mounted on said base, said casing being movably supported on said base through said support shaft for movement of said slotting tool toward the inner circumferential surface of the tubular workpiece when the tubular workpiece is to be slotted.

15. A slotting apparatus according to claim 13, wherein said moving means comprises a speed reducer, a cam operatively coupled to one of said first and second drive crankshafts through said speed reducer, a cam follower mounted on said base and held in engagement with said cam, and drive means for rotating one of said first and second drive crankshafts, said cam having a cam profile for moving said casing to move said slotting tool progressively toward and away from the inner circumferential surface of the tubular workpiece in response to actuation of said drive means when the tubular workpiece is slotted.

16. A slotting apparatus according to claim 1, wherein said casing has a case housing said tool support and said first and second link arms, said case having a hole defined therethrough, said slotting tool projecting out of said case through said hole, further including an expandable and contractable protective boot extending between said slotting tool and said case in covering relationship to said hole.

17. A slotting apparatus for producing a slot having a substantially arcuate cross section axially in an inner circumferential surface of a tubular workpiece held in position, comprising:

a tool support means for supporting on a distal end thereof a slotting tool to be inserted into the tubular workpiece for slotting said tubular workpiece;

said mounting means for mounting said tool support means and said slotting tool for movement in axial and transverse directions of said tubular workpiece;

first and second link arms disposed on said mounting means and spaced from each other substantially in the axial direction of said tubular workpiece, said first and second link arms being pivotally mounted at respective first ends thereof on said tool support means and extending from said tool support means;

a first support shaft disposed on said mounting means; one of said first and second link arms having a second end pivotally supported on said mounting means through said first support shaft;

a second support shaft eccentrically rotatably disposed on said mounting means, the other of said first and second link arms having a second end pivotally supported on said second support shaft, wherein said second support shaft is eccentrically mounted about an axis of rotation and disposed a predetermined distance from said axis of rotation;

said tool support means being pivotally supported by said first and second link arms for pivoting movement about said first and second support shafts, respectively, to cause the slotting tool to move along the inner circumferential surface of the tubular workpiece;

means for displacing said tool support means to move said tool support means and said slotting tool reciprocally substantially in the axial direction of said tubular workpiece, wherein said tool support means is displaced in said axial direction simultaneously as said second support shaft is rotated about said eccentric axis;

wherein when said tool support means is moved in one direction axially with respect to said tubular workpiece by said means for displacing and upon rotation of said second support shaft, said slotting tool follows a path to cut off substantially arcuately the inner circumferential surface of the tubular workpiece, and when said tool support means is moved in an opposite direction axially with respect to said tubular workpiece, said slotting tool follows a path transversely spaced from the inner circumferential surface of the tubular workpiece and substantially parallel to the axis of the tubular workpiece.

18. The slotting apparatus according to claim 17, further including a pair of guides fixedly mounted on said mounting means on opposite sides of said tool support means, said guides having respective guide grooves defined in inner surface thereof and extending in the direction in which said tool support means is movable, said tool support mean having opposite marginal side edges slidably fitted in said guide grooves, respectively, whereby said tool support means is supported on said mounting means through said guides for movement in the axial and transverse directions of the tubular workpiece.

19. The slotting apparatus according to claim 17, wherein said second support shaft comprises an eccentric shaft member connected to another shaft member rotatably disposed on said axis of rotation, said eccentric shaft member being out of alignment with said axis of rotation, said second end of the other of said first and second link arms being pivotally supported on said eccentric shaft member.

20. The slotting apparatus according to claim 17, wherein said tool support means has an oblong hole defined therein at a position corresponding to said means for displacing the tool support means and extending substantially perpendicularly to the direction in which said tool support means is reciprocally movable, said means for displacing the tool support means having an eccentric shaft out of alignment with an axis of rotation thereof, said eccentric shaft slidably engaging in said oblong hole.

21. The slotting apparatus according to claim 20, wherein one of said first and second link arms which is positioned more remotely from the tubular workpiece than the other link arm is pivotally supported on said second support shaft, and said means for displacing the tool support means being positioned relatively to said second support shaft such that when the eccentric shaft of said means for displacing the tool support means revolves around the axis of rotation of said means for displacing the tool support means into a position farthest from the tubular workpiece said second support shaft revolves around the axis of rotation of said second support shaft into a position farthest from the tubular workpiece upon rotation of said second support shaft in synchronism with said means for displacing the tool support means, further including an interlinking means, interconnecting said second support shaft and said means for displacing the tool support means, for rotating the second support shaft and said means for displacing the tool support means synchronously in one direction.

22. The slotting apparatus according to claim 21, wherein said interlinking means comprises a pair of pulleys mounted on said second support shaft and the means for displacing the tool support means respectively, for rotation therewith about the respective axes of rotation thereof, and a pulley belt trained around said pulleys.

23. The slotting apparatus according to claim 21, wherein said interlinking means comprises a pair of gears mounted on said second support shaft and said means for displacing the tool support means, respectively, for rotation therewith about the respective axes of rotation thereof, and an idle gear meshing with said gears and rotatably supported on said mounting means.

24. The slotting apparatus according to claim 20, wherein one of said first and second link arms which is positioned more closely to the tubular workpiece than the other link arm is pivotally supported on said second support shaft, said second support shaft and said means for displacing the tool support means being positioned relatively to each other such that when the eccentric shaft of said means for displacing the tool support means revolves around the axis of rotation of said means for displacing the tool support means into a position farthest from the tubular workpiece said second support shaft revolves around the axis of rotation of said second support shaft into a position farthest from the tubular workpiece upon rotation of said second support shaft in synchronism with said means for displacing the tool support means, further including an interlinking means, interconnecting said second support shaft and said means for displacing the tool support means, for rotating the second support shaft and said means for displacing the tool support means synchronously in opposite directions, respectively.

25. The slotting apparatus according to claim 24, wherein said interlinking means comprises a pair of pulleys mounted on said second support shaft and the means for displacing the tool support means, respectively, for rotation therewith about the respective axes of rotation thereof, and a pulley belt trained in a crossed fashion around said pulleys.

26. The slotting apparatus according to claim 17, further including drive means for rotating one of said second support shaft and said means for displacing the tool support means.

27. The slotting apparatus according to claim 26, wherein said drive means comprises a motor fixedly mounted on said mounting means and having a drive shaft, a drive pulley mounted on said drive shaft of the motor, a driven pulley mounted on one of said second support shaft and said means for displacing the tool support means for rotation therewith about the axis of rotation thereof, and a pulley belt trained around said drive and driven pulleys.

28. The slotting apparatus according to claim 17, further including a workpiece holder for holding the tubular workpiece and moving the inner circumferential surface of the tubular workpiece confronting the slotting tool toward the slotting tool when the tubular workpiece is to be slotted, and moving means for moving said workpiece holder to move the inner circumferential surface of the tubular workpiece held by said workpiece holder progressively toward said slotting tool when the tubular workpiece is slotted.

29. The slotting apparatus according to claim 17, further including a base, said mounting means being movably supported on said base for movement of said slotting tool toward the inner circumferential surface of the tubular workpiece when the tubular workpiece is to be slotted, and moving means for moving said slotting tool progressively toward and away from the inner circumferential surface of the tubular workpiece when the tubular workpiece is slotted.

30. The slotting apparatus according to claim 29, further including a support shaft vertically mounted on said base, said mounting means being movably supported on said base through said support shaft for movement of said slotting tool toward the inner circumferential surface of the tubular workpiece when the tubular workpiece is to be slotted.

31. The slotting apparatus according to claim 29, wherein said moving means comprises a speed reducer, a cam operatively coupled to one of said first support shaft and said means for displacing the tool support means through said speed reducer, a cam follower mounted on said base and held in engagement with said cam, and drive means for rotating one of said first support shaft and said means for displacing the tool support means, said cam having a cam profile for moving said mounting means to move said slotting tool progressively toward and away from the inner circumferential surface of the tubular workpiece in response to actuation of said drive means when the tubular workpiece is slotted.

* * * * *